(12) United States Patent
Werner

(10) Patent No.: US 6,344,252 B1
(45) Date of Patent: Feb. 5, 2002

(54) DOUBLE-SIDED TAPE FOR AUTOMATIC DISPENSING GUN

(76) Inventor: Richard S. Werner, 326 Cedar Sauk Rd., West Bend, WI (US) 53095

(*) Notice: Subject to any disclaimer, the term of this patent is extended or adjusted under 35 U.S.C. 154(b) by 0 days.

(21) Appl. No.: 09/387,405

(22) Filed: Sep. 2, 1999

(51) Int. Cl.$^7$ ................................ B32B 7/00
(52) U.S. Cl. ............ 428/40.1; 206/411; 428/40.2; 428/41.3; 428/41.8; 428/41.9; 428/354; 428/906
(58) Field of Search ............. 428/906, 40.1, 428/40.2, 41.3, 41.8, 41.9, 354; 206/411

(56) References Cited

U.S. PATENT DOCUMENTS

| | | | |
|---|---|---|---|
| 2,177,627 A | 10/1939 | Drew | 428/906 |
| 2,838,421 A * | 6/1958 | Sohl | 428/906 |
| 3,675,274 A * | 7/1972 | Fried | 428/906 |
| 4,447,482 A | 5/1984 | Heinzelman et al. | 428/42.1 |
| 4,536,441 A | 8/1985 | Schmeer et al. | 428/317.3 |
| 4,614,677 A | 9/1986 | Pennace et al. | 428/40.1 |
| 4,624,893 A | 11/1986 | Shibano et al. | 428/327 |
| 4,636,432 A | 1/1987 | Shibano et al. | 428/327 |
| 4,684,557 A | 8/1987 | Pennace et al. | 428/40.1 |
| 4,839,206 A | 6/1989 | Waldenberger | 428/40.1 |
| 4,842,902 A | 6/1989 | Brown et al. | 427/387 |
| 5,082,706 A | 1/1992 | Tangney | 428/40.1 |
| 5,084,317 A | 1/1992 | Epple | 428/40.1 |
| 5,145,718 A | 9/1992 | Pedginski et al. | 427/171 |
| 5,209,973 A | 5/1993 | Willie et al. | 428/352 |
| 5,441,810 A | 8/1995 | Aizawa et al. | 428/354 |
| 5,486,389 A * | 1/1996 | Gerber | 428/41.9 |
| 5,626,928 A | 5/1997 | Summer | 428/41.8 |
| 5,667,858 A | 9/1997 | Pokorny | 428/41.8 |
| 5,851,663 A | 12/1998 | Parsons et al. | 428/355 |
| 5,874,143 A | 2/1999 | Peloquin et al. | 428/40.1 |
| 5,882,753 A | 3/1999 | Pedginski et al. | 428/40.7 |
| 5,910,370 A | 6/1999 | Katsura et al. | 428/425.5 |
| 5,932,252 A | 8/1999 | Morris, Jr. et al. | 424/717 |
| 5,932,341 A | 8/1999 | Endo et al. | 428/327 |

* cited by examiner

Primary Examiner—Nasser Ahmad
(74) Attorney, Agent, or Firm—Jansson, Shupe & Munger, Ltd.

(57) ABSTRACT

A roll of tape for use in an automatic tape gun that includes an adhesive layer having a liner-side surface and an exposed-side surface and a release-liner adhering to the liner-side surface of the adhesive layer. The adhesive-layer thickness and the release-liner are selected such that the ratio of tape length to roll diameter on a standard 1.375 in. roll core, where the tape roll has a standard outer diameter of approximately 3.1875 in., is substantially greater than about 400:1, whereby tape of extended length is usable on standard tape guns to minimize tape-roll changeovers. Version of tape having length to roll diameter ratios greater than about 500:1 are also disclosed along with length to roll diameter ratios greater than 800:1 for tape rolls having a standard outer diameter of approximately 4.3125 inches.

39 Claims, 3 Drawing Sheets

DOUBLE-SIDED TAPE FOR AUTOMATIC DISPENSING GUN

BACKGROUND OF THE INVENTION

Automatic-tape-dispensing guns ("ATG") are well known. These guns are used to lay down a double-sided adhesive that is used to mount or bond two articles together. Such adhesive can have opposing sides of the same or varying tack and/or adhesion.

Currently, most of the ATG's use rolls of tape that are 36 yards long. These rolls have a standard outer diameter of approximately 3.1875 inches when wound on a standard 1.375 inch outer diameter core. In a normal operation, one may use several of these rolls of tape in a given day. During each changeover, each roll of tape must be individually threaded in the ATG. This is a time consuming process that results in lost productivity.

Previous attempts to store greater lengths of tape on rolls of a standard outer diameter have failed in that thinner tape has a thin release-liner that easily breaks, or the adhesive layer is to thin to allow for an acceptable application.

Although ATG tape rolls of 60 yards in length exist such rolls have a standard outer diameter of approximately 4.3125 inches. Because the 60 yard rolls have an increased outer diameter, a specially sized gun such as the one manufactured by 3M® Corporation of Minneapolis, Minn., is required to use them. The purchase of this gun requires an extra investment on the part of the tape user.

There is a long felt need to develop an ATG tape that allows for a greater length of tape to be stored on rolls having a standard outer diameter. Therefore, a tape capable of being used in a standard size ATG that is able to be wound so as to provide for a greater length of tape per roll would be an important improvement in the art.

OBJECTS OF THE INVENTION

An object of the invention is to provide a double-sided tape for an automatic dispensing gun that overcomes some of the problems and shortcomings of the prior art.

Another object of the invention is to provide a double-sided tape for an automatic dispensing gun that is capable of being rolled so that nearly twice the length of tape is capable of being used in existing automatic tape dispensing gun.

Yet another object of the invention is to provide a double-sided adhesive transfer tape for an automatic dispensing gun.

Still another object of the invention is to provide a carrier supported double-sided tape for an automatic dispensing gun where the tape utilizes a liner having a thickness no greater than 2 mils. How these and other objects are accomplished will become apparent from the following descriptions and from the drawings.

SUMMARY OF THE INVENTION

The invention involves a roll of tape for an automatic tape gun. The tape is comprised of an adhesive layer having a liner-side surface and an exposed-side surface. A release-liner adheres to the liner-side surface of the adhesive layer. The invention involves the selection of the thickness of the adhesive-layer and the release-liner such that the ratio of tape length to roll diameter on a standard 1.375 inch outer diameter roll core where the tape roll has a standard outer diameter of approximately 3.1875 inches, is substantially greater than about 400:1, whereby tape of extended length is usable on standard tape guns thereby minimizing the number of tape-roll changeovers.

In one embodiment of the invention, the ratio of tape length to roll diameter is greater than about 500:1. In a preferred version of this embodiment, the ratio of tape length to roll diameter is greater than about 550:1.

The release liner used in the tape involved in the invention has a thickness no greater than 2 mils. While no specific material is required for the liner, in a preferred embodiment, the release liner is a polymeric film such as polypropylene, polyester, nylon or polystyrene. This preferred liner also has a thickness no greater than 2 mils. It is also noted that the tape is capable of being wound around the roll core in a conventional manner or it may be what is known as reverse wound (i.e., the release-liner faces the inner core).

In one embodiment of the invention, the adhesive layer may be what is known in the art as an unsupported adhesive layer while yet in another embodiment, the adhesive layer may be reinforced on one or both side surfaces. In a specific version of such embodiment, glass beads, or fibers of glass, pulp, paper and the like may be used to reinforce the adhesive.

While it is preferred that both of the adhesive surfaces are of the same tack and adhesion, those skilled in the art will recognize that it is possible to construct the tape with one surface having a stronger tack and/or adhesion than the other surface without departing from the spirit or scope of the invention.

In another embodiment of the invention, the adhesive layer includes a carrier having first and second sides with each side having adhesive thereon. The first-side adhesive forms the liner-side surface of the adhesive layer while the second-side adhesive forms the exposed-side surface.

The thickness of the carrier is less than about ½ mil. Although the carrier can be made of various materials including paper, tissue and the like, in a preferred embodiment of the invention, the carrier is made of a polymeric film.

In still another embodiment of the invention, the adhesive-layer thickness and the release-liner are selected such that the ratio of tape length to roll diameter on a standard 1.375 inch outer diameter roll core where the tape roll has a standard outer diameter of approximately 4.3125 inches, is substantially greater than 500:1. In a specific version of such embodiment, the ratio of tape length to roll diameter is greater than about 600:1 while in a more preferred version, the ratio is greater than about 800:1.

In yet another embodiment of the invention, the adhesive-layer thickness and the release-liner are selected such that the ratio of tape length to tape thickness for a one-inch length of tape is substantially greater than about 195:1. In a specific version of such embodiment, the tape length to tape thickness ratio is greater than about 270:1 while in a more specific version the length to thickness ratio is greater than about 370:1.

The invention also involves a method of manufacturing a roll of tape for use in an automatic-tape gun. Such method is comprised of the steps of: (1) preparing an adhesive layer having a liner-side surface and an exposed-side surface; (2) attaching a release-liner having a thickness of 2 mils or less to the liner-side surface of the adhesive; and (3) winding the film release-liner around a core.

DETAILED DESCRIPTION OF THE PREFERRED EMBODIMENTS

Figure 1:
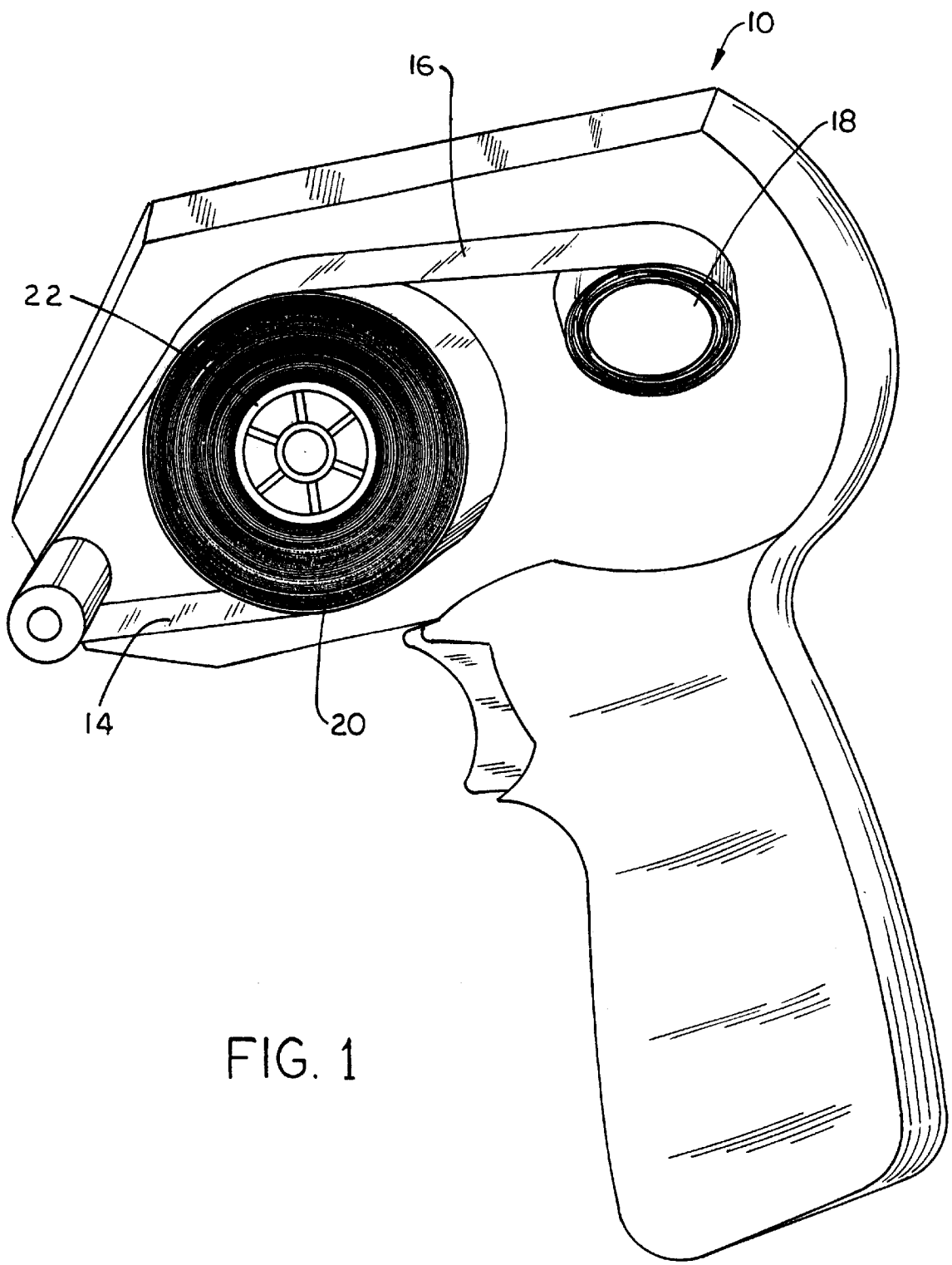
FIG. 1 is a perspective of an automatic-tape-dispensing gun showing a roll of tape positioned within the gun.

Before describing the invention it will be helpful to first describe the environment in which the invention is used. An automatic-tape gun (ATG) 10, which is shown in FIG. 1 is used to allow for the neat application of a strip of adhesive 12 or tape 14 to a surface to enable one to mount two articles or substrates together. These guns 10 operate in a manner that allows the adhesive 12 to transfer on to a surface while the protective release liner 16 that separates the adhesive 12 on the wound roll 20 is collected around a take-up spool 18 within the gun 10.

The standard ATG 10 utilizes rolls 20 of tape 14 that are 36 yards in length and have an outer diameter of approximately 3.1875 inches when wound on a core 22 having an outer diameter of 1.375 inches. Such tape has a tape length to roll diameter ratio of approximately 400:1 (1296 inches (36 yards)÷3.1875 inches). Another standard version of the ATG 10 is the 3M® 700 gun manufactured by 3M® Corporation. The 3M® gun uses a tape roll 20 that is 60 yards in length and has an outer diameter of approximately 4.3125 inches when wound on a standard core 22 having a 1.375 inch outer diameter. This 3M® tape roll has a tape length to roll diameter ratio of approximately 500:1 (2160 inches÷4.3125 inches).

It is worth noting, as shown in FIG. 1, that cores used in manufacturing tape rolls for ATG's may also have a concentric inner wall having a diameter of about 1 inch. However, it is the outer diameters of such cores that are used for the purpose of establishing a reference point from which to define the invention, which relates to ATG tape and not to any particular gun or roll dimension. It is to be appreciated that one may not deviate from the scope and spirit of the invention simply by winding the inventive tape around a core having a 1 inch diameter.

Figure 2:
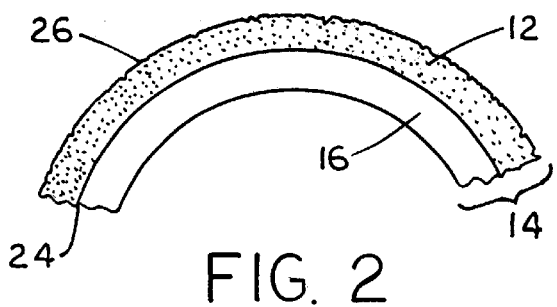
FIG. 2 is a sectional view of the tape showing the release liner attached to the liner-side surface of the adhesive layer.
Figure 3:
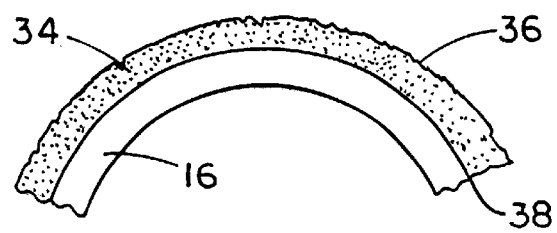
FIG. 3 is a sectional view of the tape showing the release liner attached to a reinforced adhesive layer.
Figure 5:
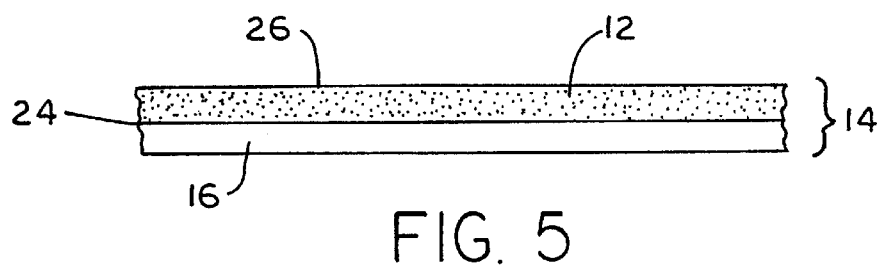
FIG. 5 is a sectional view of the tape showing a length of the tape having a release liner and an adhesive layer.

The invention is related to a roll 20 of tape 14 used in an ATG 10. As shown in FIGS. 2, 3 and 5, the tape 14 is comprised of an adhesive layer 12 which has a liner-side surface 24 and an exposed-side surface 26. A release liner 16 adheres to the liner-side surface 24 of the adhesive layer 12. The invention involves the selection of the thickness of the adhesive-layer 12 and the release liner 16 such that the ratio of tape length to roll diameter on a standard 1.375 inch roll core 22, where the tape roll 20 has a standard outer diameter of approximately 3.1875 inches, is substantially greater than 400:1 whereby tape 14 of extended length is usable on standard tape guns 10 thereby minimizing the number of tape-roll changeovers.

In one embodiment of the invention, the ratio of tape length to roll diameter is greater than about 500:1 while in a specific version of the embodiment, the ratio of tape length to roll diameter is greater than about 550:1. This allows tape rolls 20 of approximately 50 yards in length to be used in a standard ATG 10.

Current ATG tapes 14 utilize a paper-silicone-release liner 16 that has an average thickness between 3–4 mils (1 mil=0.001 inch). The release liner 16 used in the tape 14 involved in the invention has a thickness no greater than 2 mils. While no specific material is required for the liner 16, in a preferred embodiment, the release liner 16 is a polymeric film such as polypropylene, polyester, nylon or polystyrene. These film liners 16 have a greater tensile strength than siliconized paper, thereby allowing for a thinner release liner 16 than is currently in use. Furthermore, they exhibit greater tear resistance than paper liners. Such film liners 16 also have a thickness no greater than 2 mils. By using a thinner release liner 16, one is able to wind a greater length of tape 14 on a roll 20 having a standard outer diameter. This increase in length of tape 14 reduces the number of roll changes required in a day, thus increasing the productivity of the ATG operator.

Figure 6:
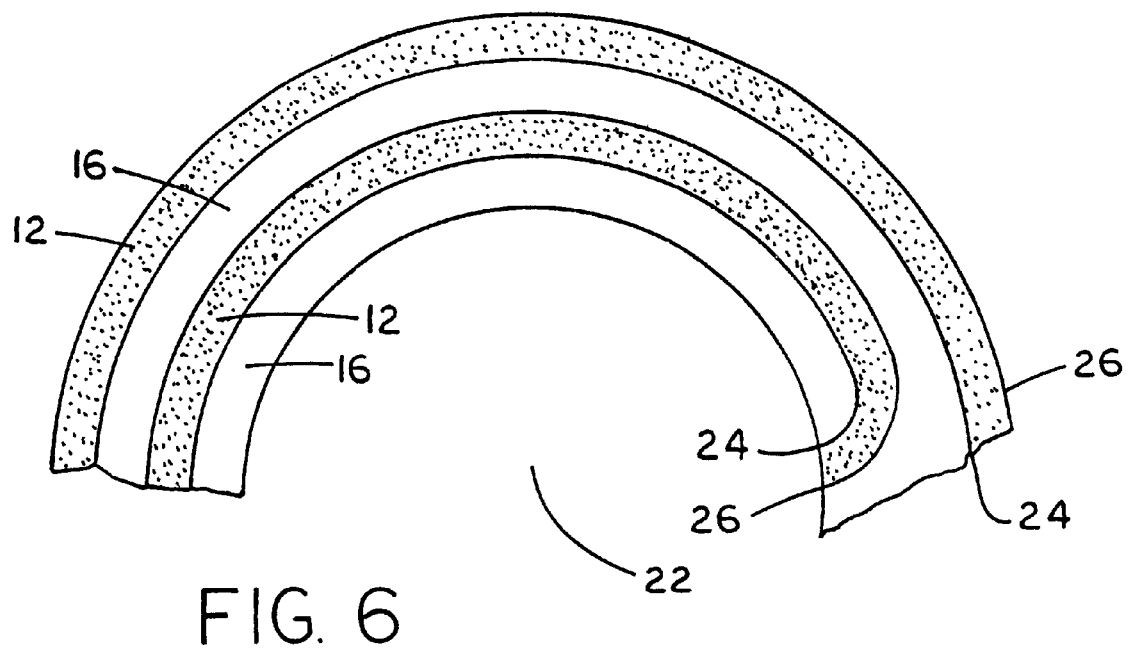
FIG. 6 is a sectional view of a section of a roll of unsupported tape reverse wound around a core.
Figure 7:
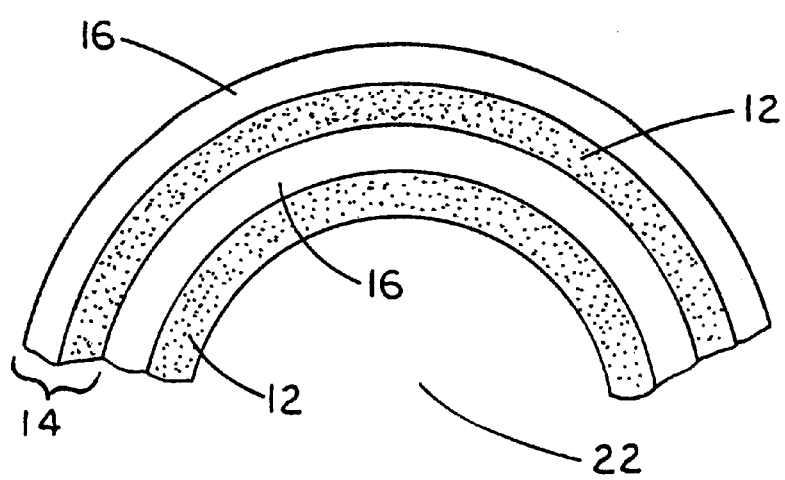
FIG. 7 is a sectional view of a section of a roll of unsupported tape conventionally wound around a core.

It is worth noting that the length of tape 14 capable of being stored on a roll 20 is not dependant on the direction that tape 14 is wound. That is, the tape 14 may be wound around the roll core 22 in a conventional manner as shown in FIG. 7, or it may be what is known as reverse wound (i.e., the release liner 16 faces the inner core 22) as shown in FIG. 6.

In one embodiment of the invention, the adhesive layer 12 may be what is known in the art as an unsupported free-film adhesive layer 12 while yet in another embodiment, as shown in FIG. 3, the adhesive layer 12 may be an unsupported layer 34 reinforced on one or both side surfaces 36, 38. In a specific version of the reinforced embodiment, glass beads or fibers of glass, pulp, paper and the like may be used to reinforce the adhesive layer 34. Such reinforcement allows for the sides 36, 38 of the reinforced adhesive layer 34 to have differing degrees of tack and/or adhesion.

While it is preferred that both of the adhesive surfaces 24, 26 are of the same tack and adhesion, those skilled in the art will recognize that it is possible to construct the tape 14 with one surface having a stronger tack and/or adhesion than the other surface without departing from the spirit or scope of the invention.

Figure 4:
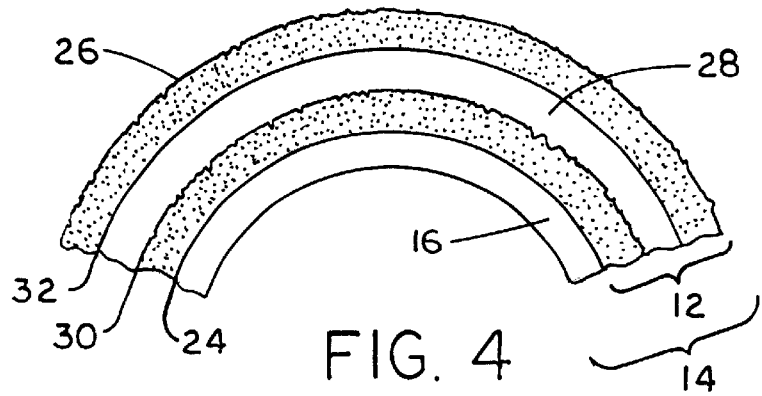
FIG. 4 is a sectional view of one embodiment of the invention showing a carrier layer positioned within the adhesive layer with a release liner attached to one of the adhesive layers.

FIG. 4 shows another embodiment of the invention wherein the adhesive layer 12 includes a carrier 28 having first and second sides 30, 32 with each side having adhesive 12 thereon. The first-side adhesive 30 forms the liner-side surface 24 of the adhesive layer 12 while the second-side adhesive 32 forms the exposed-side surface 26. The thickness of the carrier 28 in the inventive tape 14 is less than about ½ mil. Although the carrier 28 can be made of various materials including paper, tissue and the like, in a preferred embodiment of the invention, the carrier 28 is made of a polymeric film. As with the release liner 16 in the unsupported tape 14, the thinner the carrier 28 the greater the length of tape 14 that can be stored on a single roll 20.

The invention can also be described in relation to a roll 20 of tape 14 having a standard outer diameter of approximately 4.3125 inches, the standard diameter for tape rolls 20 used in 3M's® standard ATG. In such tape 14, the adhesive-layer 12 thickness and the release-liner 16 are selected such that the ratio of tape length to roll diameter on a standard 1.375 inch roll core 22 is substantially greater than 500:1. In a specific version of such embodiment, the ratio of tape length to roll diameter is greater than about 650:1 while in a still more specific version, the ratio is greater than about 800:1. This allows rolls 20 of tape 14 over 90 yards in length to be used in 3M's® standard ATG. Currently, tape rolls 20 of only 60 yards in length are known for use in the 3M® ATG.

As can be seen from the tape length to roll diameter ratios discussed above, the tape 14 that is the subject of the invention has the capability of providing a 30% or more increase in the length of tape 14 stored on a standard ATG tape roll 20 having an outer diameter of approximately 3.1875 inches or 50% or more increase on a 3M® standard ATG tape roll 20 having an outer diameter of approximately 4.3125 inches.

Another way to describe the invention is based on a thickness to length ratio. That is, the adhesive-layer 12 thickness and the release-liner 16 are selected such that the ratio of tape length to tape thickness for a one-inch length of tape is substantially greater than about 195:1. In a specific version of such embodiment, the tape length to tape thickness ratio is greater than about 270:1 while in a more specific version the length to thickness ratio is greater than about 370:1.

The conventional unsupported-adhesive tape 14 currently used in a standard ATG gun 10 has a 3.1 mils paper-silicone liner 16 and a 2 mils adhesive layer 12. Such adhesive layer may include some form of particle reinforcement. The carrier 28 supported version of such tape 14 has a ¼ mil polymeric film carrier 28, a 1¾ mil adhesive layer 12 (i.e., ⅞ mil on each side of the carrier) and a 3.1 mil paper-silicone liner 16. For a one-inch piece of tape 14, these particular tapes 14 have a length to thickness ratio of approximately 195:1.

FIG. 5 shows one embodiment of the invention which combines a 2 mil release liner 16 with a 1 mil adhesive layer 12. Such combination results in a length to thickness ratio of 333:1. By reducing the thickness of the release liner 16 to 1.7 mil in another embodiment, the length to thickness ratio can vary between 270:1 for a version using a 2 mil adhesive layer 12 to 370:1 for a version of the embodiment using a 1 mil adhesive layer 12. Therefore, one can easily see how the selective combination of adhesive-layer 12 and release-liner 16 thickness in the inventive tape 14 produces a thinner tape 14 that allows for a greater length of tape 14 to be stored on a roll 20 of standard outer diameter.

The invention also involves a method of manufacturing a roll 20 of tape 14 for use in an automatic-tape gun 10. Such method is comprised of the steps of: (1) preparing an adhesive layer having a liner-side surface and an exposed-side surface (2) attaching a release-liner having a thickness of 2 mils or less to the liner-side surface of the adhesive; and (3) winding the film release-liner around a core.

While the principles of the invention have been shown and described in connection with but a few embodiments, it is to be understood clearly that such embodiments are by way of example and are not limiting.

What is claimed is:

1. A roll of transfer tape in combination with an automatic tape gun, wherein the tape comprises:
    an adhesive layer having a liner-side surface and an exposed-side surface; and
    a film release-liner adhering to the liner-side surface of the adhesive layer, the adhesive-layer thickness and the release-liner being selected such that the ratio of tape length to roll diameter on a standard 1.375 in. roll core, where the tape roll has a standard outer diameter of approximately 3.1875 in., is substantially greater than about 400:1,
    whereby tape of extended length is usable on standard tape guns to minimize tape-roll changeovers.

2. The automatic tape-gun tape roll of claim 1 wherein the ratio of tape length to roll diameter is greater than about 500:1.

3. The automatic tape-gun tape roll of claim 2 wherein the ratio of tape length to roll diameter is greater than about 550:1.

4. The automatic tape-gun tape roll of claim 1 wherein the release-liner has a thickness no greater than 2 mils.

5. The automatic tape-gun roll of claim 1 wherein the adhesive layer is an unsupported adhesive layer.

6. The automatic tape-gun role of claim 5 wherein at least one of the liner-side and the exposed-side surfaces of the adhesive layer is reinforced.

7. The automatic tape-gun role of claim 6 wherein glass particles are in the adhesive layer near the liner-side surface and the exposed-side surface, thereby providing such reinforcement and desired tack and adhesion for such surfaces.

8. The automatic tape-gun tape roll of claim 1 wherein the tape is reverse wound on the core.

9. The automatic tape-gun tape roll of claim 1 wherein the release-liner is a polymeric film.

10. The automatic tape-gun tape roll of claim 9 wherein the release-liner has a thickness no greater than 2 mils.

11. The tape of claim 1 wherein the adhesive layer includes a carrier therewithin having first and second sides each having adhesive thereon, the first-side adhesive forming the liner-side surface of the adhesive layer and the second-side adhesive forming the exposed-side surface of the adhesive layer.

12. The tape of claim 11 wherein the thickness of the carrier is less than about ½ mil.

13. The tape of claim 12 wherein the carrier is made of polymeric film.

14. A roll of transfer tape in combination with an automatic tape gun, wherein the tape comprises:
    an adhesive layer having a liner-side surface and an exposed-side surface; and
    a film release-liner adhering to the liner-side surface of the adhesive layer, the adhesive-layer thickness and the release-liner being selected such that the ratio of tape length to roll diameter on a standard 1.375 in. roll core where the tape roll has a standard outer diameter of approximately 4.3125 in., is substantially greater than about 500:1,
    whereby tape of extended length is usable on standard tape guns to minimize tape-roll changeovers.

15. The automatic tape-gun tape roll of claim 14 wherein the ratio of tape length to roll diameter is greater than about 650:1.

16. The automatic tape-gun tape roll of claim 15 wherein the ratio of tape length to roll diameter is greater than about 800:1.

17. The automatic tape-gun tape roll of claim 14 wherein the release-liner has a thickness no greater than 2 mils.

18. The automatic tape-gun roll of claim 14 wherein the adhesive layer is an unsupported adhesive layer.

19. The automatic tape-gun role of claim 18 wherein at least one of the liner-side and the exposed-side surfaces of the adhesive layer is reinforced.

20. The automatic tape-gun role of claim 19 wherein glass particles are in the adhesive layer near the liner-side surface and the exposed-side surface, thereby providing such reinforcement and desired tack and adhesion for such surfaces.

21. The automatic tape-gun tape roll of claim 14 wherein the tape is reverse wound on the core.

22. The automatic tape-gun tape roll of claim 14 wherein the release-liner is a polymeric film.

23. The automatic tape-gun tape roll of claim 22 wherein the release-liner has a thickness no greater than 2 mils.

24. The tape of transfer claim 14 wherein the adhesive layer includes a carrier therewithin having first and second sides each having adhesive thereon, the first-side adhesive forming the liner-side surface of the adhesive layer and the second-side adhesive forming the exposed-side surface of the adhesive layer.

25. The tape of claim 24 wherein the thickness of the carrier is less than about ½ mil.

26. The tape of claim 25 wherein the carrier is made of polymeric film.

27. A roll of tape in combination with an automatic tape gun, wherein the tape comprises:

an adhesive layer having a liner-side surface and an exposed-side surface; and a film release-liner adhering to the liner-side surface of the adhesive layer, the adhesive-layer thickness and the release-liner being selected such that the ratio of tape length to tape thickness for a one-inch length of tape is substantially greater than about 195:1, whereby tape of extended length is usable on standard tape guns to minimize tape-roll changeovers.

28. The automatic tape-gun tape of claim 1 wherein the ratio is greater than about 270:1.

29. The automatic tape-gun tape of claim 1 wherein the ratio is greater than about 370:1.

30. The automatic tape-gun tape roll of claim 27 wherein the release-liner has a thickness no greater than 2 mils.

31. The automatic tape-gun roll of claim 27 wherein the adhesive layer is an unsupported adhesive layer.

32. The automatic tape-gun role of claim 31 wherein at least one of the liner-side and the exposed-side surfaces of the adhesive layer is reinforced.

33. The automatic tape-gun role of claim 32 wherein glass particles are in the adhesive layer near the liner-side surface and the exposed-side surface, thereby providing such reinforcement and desired tack and adhesion for such surfaces.

34. The automatic tape-gun tape roll of claim 27 wherein the tape is reverse wound on the core.

35. The automatic tape-gun tape roll of claim 27 wherein the release-liner is a polymeric film.

36. The automatic tape-gun tape roll of claim 35 wherein the release-liner has a thickness no greater than 2 mils.

37. The tape of claim 27 wherein the adhesive layer includes a carrier therewithin having first and second sides each having adhesive thereon, the first-side adhesive forming the liner-side surface of the adhesive layer and the second-side adhesive forming the exposed-side surface of the adhesive layer.

38. The tape of claim 37 wherein the thickness of the carrier is less than about ½ mil.

39. The tape of claim 38 wherein the carrier is made of polymeric film.

* * * * *

UNITED STATES PATENT AND TRADEMARK OFFICE
CERTIFICATE OF CORRECTION

PATENT NO. : 6,344,252 B1
DATED : February 5, 2002
INVENTOR(S) : Richard S. Werner It is certified that error appears in the above-identified patent and that said Letters Patent is hereby corrected as shown below:

<u>Column 7,</u>
Line 5, delete "transfer".
Line 15, after "of", insert -- transfer --.

Signed and Sealed this

Sixteenth Day of July, 2002

*Attest:*

*Attesting Officer*

JAMES E. ROGAN
*Director of the United States Patent and Trademark Office*